United States Patent
Salmon

(10) Patent No.: US 7,514,010 B2
(45) Date of Patent: Apr. 7, 2009

(54) WATER FILTERING METHOD AND APPARATUS

(76) Inventor: Daniel J. Salmon, 4165 Norway Pl., Hamburg, NY (US) 14075

( * ) Notice: Subject to any disclaimer, the term of this patent is extended or adjusted under 35 U.S.C. 154(b) by 0 days.

(21) Appl. No.: 11/825,741

(22) Filed: Jul. 9, 2007

(65) Prior Publication Data

US 2008/0217230 A1  Sep. 11, 2008

(51) Int. Cl.
 *B01D 37/02* (2006.01)
 *B01D 63/00* (2006.01)
 *B01D 61/00* (2006.01)
(52) U.S. Cl. .............. 210/777; 210/778; 210/257.2; 210/652; 210/195.2; 210/333.01; 210/333.1; 210/636; 55/523
(58) Field of Classification Search .......... 210/777, 210/778, 652, 807, 333.01, 333.1, 636, 195.2, 210/257.2, 688, 639, 263, 650; 55/523
See application file for complete search history.

(56) References Cited

U.S. PATENT DOCUMENTS

| | | | |
|---|---|---|---|
| 3,680,699 A | | 8/1972 | MacPherson |
| 4,571,389 A | | 2/1986 | Goodwin et al. |
| 4,610,792 A | * | 9/1986 | Van Gils et al. .............. 210/639 |
| 4,765,545 A | | 8/1988 | Van Kruining |
| 5,073,178 A | | 12/1991 | Mimori et al. |
| 5,106,510 A | | 4/1992 | Rieber |
| 5,198,006 A | * | 3/1993 | Mimori et al. .............. 55/523 |
| 5,207,910 A | | 5/1993 | Rieber |
| 5,364,534 A | * | 11/1994 | Anselme et al. .............. 210/650 |
| 5,595,667 A | * | 1/1997 | Rieber .............. 210/769 |
| 6,133,792 A | * | 10/2000 | Hansson .............. 330/279 |
| 6,332,977 B1 | * | 12/2001 | Janecek .............. 210/96.1 |
| 6,537,456 B2 | * | 3/2003 | Mukhopadhyay .............. 210/652 |
| 6,572,641 B2 | * | 6/2003 | Brugger et al. .............. 607/106 |
| 6,712,974 B1 | | 3/2004 | Palm et al. |
| 6,890,373 B2 | * | 5/2005 | Nemoto et al. .............. 95/90 |
| 7,014,682 B2 | * | 3/2006 | Hickerson et al. .............. 95/92 |
| 7,014,771 B2 | * | 3/2006 | Bandyopadhyay et al. .. 210/663 |
| 7,309,425 B2 | * | 12/2007 | Bandyopadhya et al. .... 210/196 |
| 2004/0055957 A1 | | 3/2004 | Palm et al. |
| 2004/0211724 A1 | | 10/2004 | Gibson et al. |
| 2005/0029195 A1 | | 2/2005 | Gibson et al. |
| 2008/0308465 A1 | * | 12/2008 | Osaheni et al. .............. 208/253 |

FOREIGN PATENT DOCUMENTS

| | | |
|---|---|---|
| EP | 0 269 769 | 6/1988 |
| GB | 826 740 | 1/1960 |
| GB | 2 172 519 | 9/1986 |
| WO | WO 2004/041401 | 5/2004 |

\* cited by examiner

*Primary Examiner*—Ana M Fortuna
(74) *Attorney, Agent, or Firm*—Milde & Hoffberg, LLP

(57) ABSTRACT

A "polishing" water filter for the micro-filtration of fine particles comprises a porous ceramic substrate, having an average pore size in the range of about 0.2 to about 100 microns, which is coated with porous rice hull ash (RHA) particles that have an average particle size that is greater than the average pore size of the ceramic substrate. The ceramic substrate preferably has an average pore size of about 30 microns; the RHA has an average particle size in the range of about 120 to about 150 microns and an average pore size in the range of about 0.5 to about 10 microns.

22 Claims, 4 Drawing Sheets

WATER FILTERING METHOD AND APPARATUS

BACKGROUND OF THE INVENTION

The present invention concerns a so-called "polishing" water filter for micro-filtration of extremely fine mineral particles, biological microorganisms and the like. The invention further relates to a method of making such a polishing water filter and to methods of using this water filter.

Many waste water treatment plants are now being built utilizing micro-filtration technology. This technology is designed to remove microorganisms such as *giardia*, which are about 3 microns wide and about 10 microns-long. Over time, fibers within the micro-filtration filter can break off, leaving openings up to 400 microns wide so that the *giardia* pass through. No known means are presently available to block these microorganisms, short of adding a further micro-filtration unit.

Water desalinization plants typically operate using reverse osmosis (RO) membranes that are very expensive and fragile. Such membranes are also susceptible to clogging by undissolved particles and by microorganism growth on the membrane. For example, a Total Organic Carbon (TOC) load of only one milligram per liter is enough food for microorganism growth to occur thereby causing a condition known as biofouling on the membrane. Any pre RO treatment process that can lower the TOC content of the RO feed water will greatly enhance the RO membrane performance. Less frequent chemical cleanings would be required thereby prolonging the life of the membranes. Also, The main function of an RO membrane is to remove dissolved salts and other molecular components from the water. The best possible pretreatment is a major goal in the RO process.

SUMMARY OF THE INVENTION

It is therefore an object of the present invention to provide a polishing water filter for micro-filtration of extremely fine particles which can remove certain biological microorganisms and reduce the color and turbidity of the water. It is a further object of the present invention to provide such a polishing filter for use in a waste water treatment plant and/or a water desalinization plant.

These objects, as well as further objects which will become apparent from the discussion that follows, are achieved, in accordance with the present invention, by providing a water filter that comprises a porous ceramic substrate, having an average pore size in the range of about 0.2 to about 100 microns, which is coated with porous rice hull ash (RHA) particles that have an average particle size that is greater than the average pore size of the ceramic substrate.

In the preferred embodiment of the invention, the ceramic substrate has an average pore size of about 30 microns; the RHA has an average particle size in the range of about 120 to about 150 microns and an average pore size in the range of about 0.5 to about 10 microns.

The ceramic substrate is preferably in the form of a hollow cylindrical core which, when in use, is provided with a housing that directs water to flow either from the outside into the center space of the filter or visa versa. The rice hull ash (RHA) is applied as a precoat to the filter core prior to filtration by mixing RHA powder to form a precoating slurry that uniformly coats the ceramic substrate.

The ceramic filter core is preferably comprised of aluminum oxide. Cores of this type are manufactured by, and commercially available from Refractron Technologies Corp., Newark, N.Y. They are normally used as air diffusers to create fine air bubbles as air is pumped through them. These monolithic ceramic filters are made with controlled and uniform pore sizes, measured in microns. The filters can be made to different specifications with pore sizes in the range from 0.2 microns to 100 microns. The particular application will determine what ceramic pore size, or range of pore sizes to select.

The porous rice hull ash (RHA) is a porous silica material comprised of approximately 98 percent silicon dioxide. RHA is manufactured by, and available commercially from Agrilectric Research Company, Lake Charles, La. RHA has excellent filtering properties such as high permeability. There are several different grades of RHA. The application specifications, the liquid to be filtered and the effluent quality determine which RHA product (grade, particle size and pore size) to use as a precoat on the ceramic core.

The average pore size of the ceramic substrate is selected to match the particle size of the RHA. It is preferable if the ceramic substrate has an average pore size in the range of about 10 to about 100 microns. A particularly advantageous pore size has been found to be about 30 microns where the RHA has an average particle size in the range of about 120 to about 150 microns.

DESCRIPTION OF THE PREFERRED EMBODIMENTS

Figure 1:
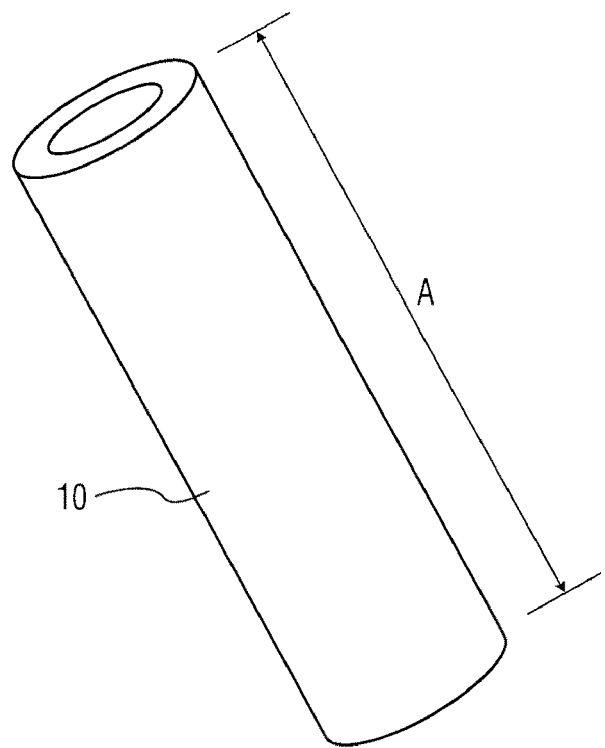
FIG. 1 is a perspective view of a ceramic filter core of the type which may be employed with the polishing water filter of the present invention.

The preferred embodiments of the present invention will now be described with reference to FIGS. 1-6. Identical elements in the various figures are designated with the same reference numerals.

Figure 2:
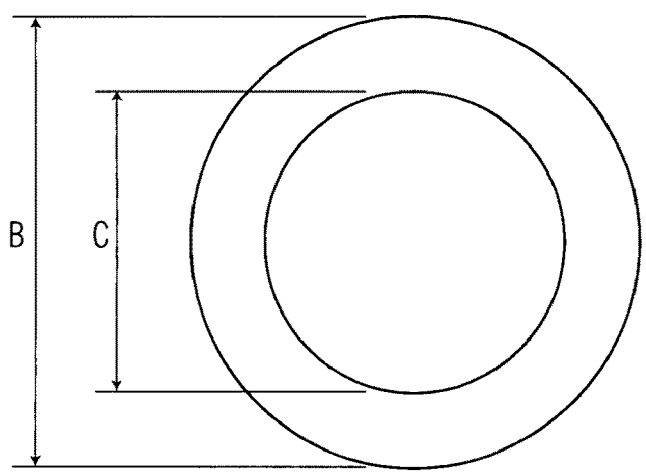
FIG. 2 is a cross sectional view of the ceramic filter core of FIG. 1.

FIGS. 1 and 2 show the preferred embodiment of the ceramic filter core used with the present invention. This filter 10 is in the shape of a hollow cylinder having a controlled and uniform pore size. In the preferred embodiment, the dimensions of the ceramic core are:

A. Length—24 inches
B. The outer diameter—2.5 inches
C. The inner diameter—1.75 inches The wall thickness is therefore approximately 10 mm.

According to the invention, the ceramic core is coated with rice hull ash (RHA). RHA is produced from "rice hulls", which, in the past, were a disposal problem in the rice milling industry. Rice hulls have a naturally high silica content (around 20 percent), a high carbon content which enables them to be used as a fuel, and a porous structure, which produces a highly porous silica ash after the hulls are burned.

There is a wide range of RHA physical and chemical properties, depending upon the different rice hull burning processes, and the soil conditions and fertilizers used in growing the rice. The "suspension burning process", which is used for power generation, generally produces more amorphous silica and less crystalline silica than other combustion processes.

Figure 3:
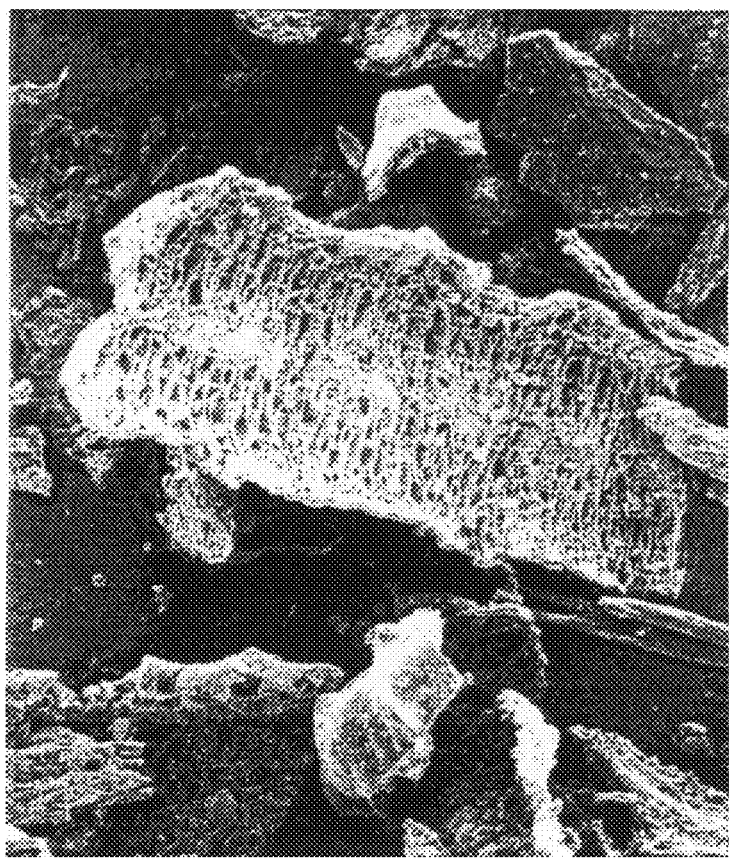
FIG. 3 is a photograph of an RHA particle of the type used with the polishing water filter of the present invention.

FIG. 3 illustrates the porous structure of a suspension burned RHA particle. RHA of this type is available from Agrilectric Research Company under the trademark MaxFlo with particle sizes in the range of 40 microns to 240 microns.

Both the average pore size and the average particle size of the RHA can be selected, as desired, to fulfill the needed requirements. A pore size in the range of about 0.5 to about 10 microns is desirable for filtering biological microorganisms and for reducing turbidity and color in water.

Depending upon the pore size of the ceramic substrate in which it is used, the RHA preferably has an average particle size in the range of about 120 to about 150 microns.

Figure 4:
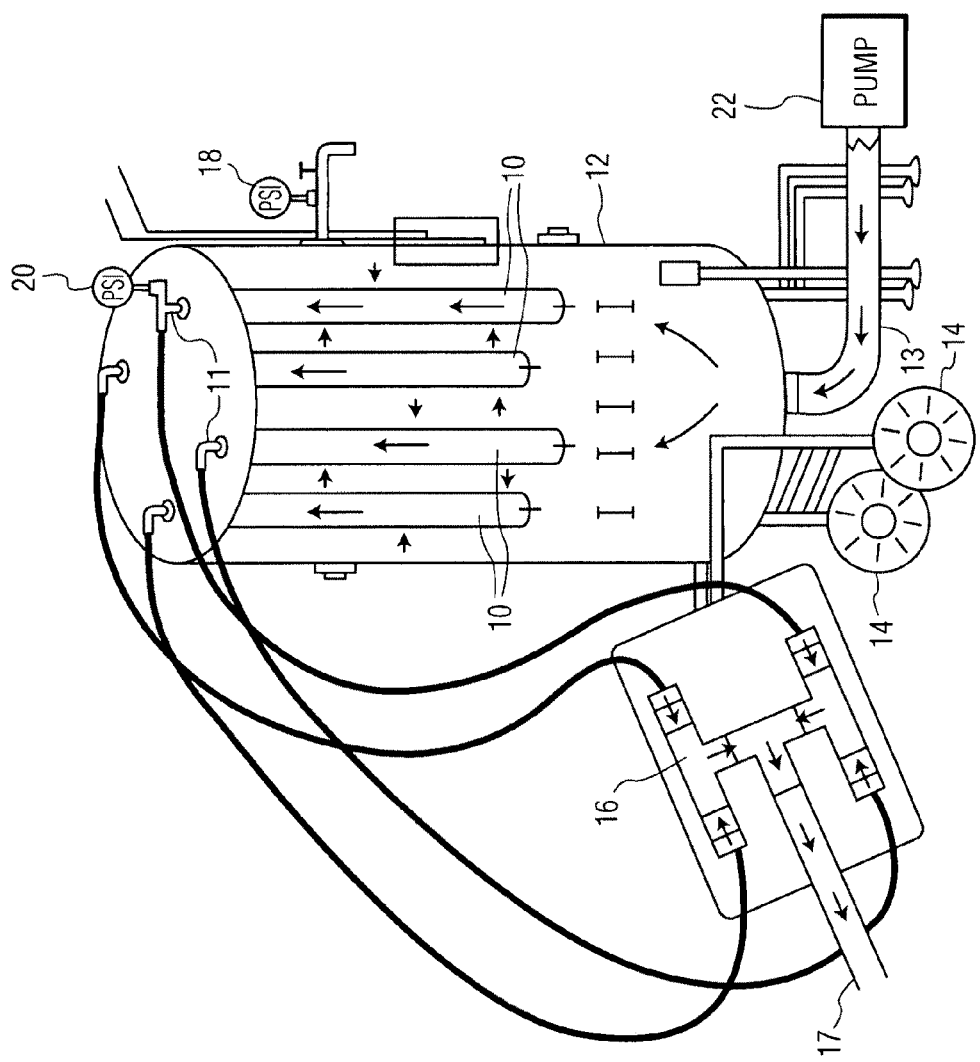
FIG. 4 is a schematic diagram of a micro-filtration water filter unit which incorporates four polishing water filter cores according to the present invention.

FIG. 4 illustrates a micro-filtration unit which comprises four filter cores of the type shown in FIG. 1 precoated with RHA. Each of the filter cores 10 is closed at one end and attached at its opposite end to a fitting 11 which collects the outflow of water. Water penetrates the filter cores from their outside surfaces and enters the hollow spaces within. The water then flows out through the fittings 11 to attached hoses which, in turn, supply it to a collection manifold 16. From there the water exits through a discharge line 17.

The unit itself comprises a steel tank 12 on wheels 14 with the removaby attached collection manifold 16. A tank PSI gauge 18 and outlet PSI gauge 20 indicate the pressure both outside and inside the filter cores, respectively. The normal operating pressure range is 10-40 PSI depending on the size of the feed 22 and ceramic filter pore size. All fittings are 316 stainless steel. All piping is schedule 80. Hoses are rated at 80 PSI. The tank is rated at 120 PSI. The inside of the tank is painted with three coats of a high grade industrial potable water epoxy coating. The outside of the tank may be coated with vehicle paint with a hardener and clear coat. The feed pump 22 may be a 115 volt, 1 HP submersible pump but can be sized smaller or larger depending on the application. The unit itself can be made larger with more filters in place, or smaller depending on the application.

Prior to operation of the filter unit, it is necessary to apply the coating of RHA to the ceramic filter core. In practice, 500 milliliters of dry rice hull ash powder is mixed with 1.5 gallons of water and poured into the influent line via a standpipe. The next step is to energize the feed pump 22 which causes the precoating slurry to enter the filter and uniformly coat the monolithic ceramic filter cores. After the water passes through the pores of the RHA present, it passes through the walls of the hollow filter cores and flows up into the collection hoses. All collection hoses combine at the manifold, forming one effluent discharge line.

Set forth below are actual test results showing the reduction in turbidity and color of water which is passed through a polishing water filter unit of the type shown in FIG. 4.

TABLE

| Date/Time | Influent | | Effluent | |
| --- | --- | --- | --- | --- |
|  | Color | Turbidity | Color | Turbidity |
| 5/12/06 5:30 PM | 33 | 2.27 | 23 | 1.3 |
| 5:50 PM | 28 | 1.86 | 20 | 1.26 |
| 6:30 PM | 29 | 1.74 | 20 | 1.02 |
| 7:30 PM | 32 | 1.56 | 16 | 0.909 |
| 5/13/06 1:45 PM | 23 | 1.44 | 16 | 0.837 |
| 2:30 PM | 25 | 1.95 | 9 | 0.425 |
| 3:00 PM | 35 |  | 8 | 0.374 |

TABLE-continued

| Date/Time | Influent | | Effluent | |
| --- | --- | --- | --- | --- |
|  | Color | Turbidity | Color | Turbidity |
| 3:05 PM | 35 |  | 8 | 0.369 |
| 3:15 PM |  | 2.0 |  | 0.287 |
| 3:40 PM | 34 | 1.84 | 6 | 0.283 |

Figure 5:
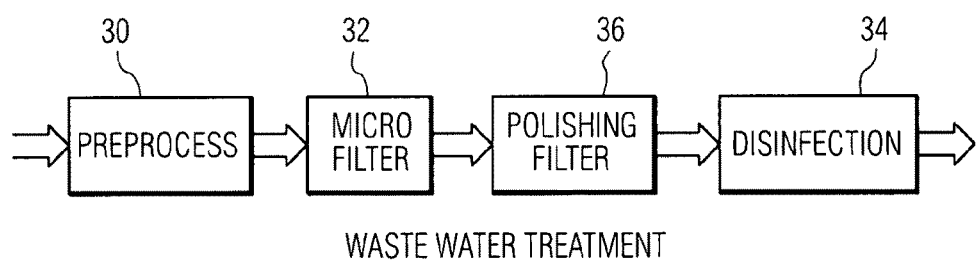
FIG. 5 is a block diagram of a waste water treatment plant utilizing a polishing water filter of the present invention.

FIG. 5 is a block diagram showing a waste water treatment plant which incorporates a polishing water filter according to the present invention. Waste water is first preprocessed at 30 and then passed through a conventional micro-filtration unit 32. Prior to disinfecting the water, e.g., by chlorination, ultraviolet or ozone treatment at 34, the water is passed through the polishing filter 36 according to the invention. This polishing filter eliminates *giardia* and other microorganisms which can pass through the micro-filter.

Figure 6:
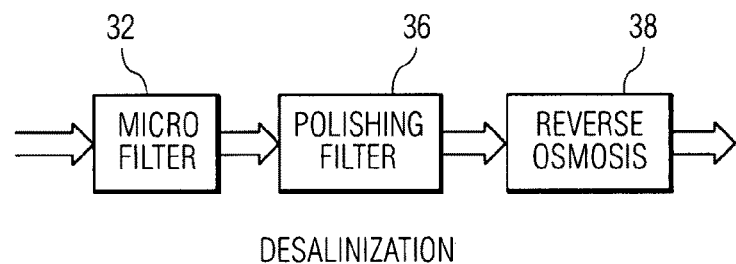
FIG. 6 is a block diagram of a desalinization plant utilizing a polishing water filter of the present invention.

FIG. 6 is a block diagram illustrating an application of the polishing the filter according to the present invention in a desalinization plant. In this case, the polishing filter 36 is inserted between the micro-filtration unit 32 and the reverse osmosis membranes 38 to help prevent fouling and/or clogging of these membranes.

There has thus been shown and described a novel water filtering method and apparatus which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A water filter for micro-filtration of extremely fine particles comprising:

(a) a porous ceramic substrate having an average pore size in the range of about 0.2 to about 100 microns;

(b) porous rice hull ash (RHA) particles coating said ceramic substrate, said RHA having an average particle size which is greater than the average pore size of the ceramic substrate; and (c) a housing surrounding the ceramic substrate having a water inlet and a water outlet and being configured for directing the flow of water from the inlet, through the ceramic substrate, to the outlet.

2. The water filter defined in claim 1, wherein said ceramic substrate has an average pore size in the range of about 10 to about 100 microns.

3. The water filter defined in claim 2, wherein said ceramic substrate has an average pore size of about 30 microns.

4. The water filter defined in claim 1, wherein said RHA has an average pore size in the range of about 0.5 to about 10 microns.

5. The water filter defined in claim 1, wherein said RHA has an average particle size in the range of about 120 to about 150 microns.

6. The water filter defined in claim 1, wherein said porous ceramic substrate is made of a material comprising essentially aluminum oxide.

7. The water filter defined in claim 1, wherein the RHA is made of a material comprising essentially amorphous silicon dioxide.

8. The water filter defined in claim 1, wherein said ceramic substrate comprises a cylindrical wall which forms a hollow cylinder with a cylindrical internal space and wherein housing directs the flow of water through the cylindrical wall.

9. The water filter defined in claim 1, wherein said housing directs the flow of water from a space outside of said hollow cylinder to the internal space.

10. The water filter defined in claim 1, the housing directs the flow of water from the internal space to a space outside of said hollow cylinder.

11. A method of making a water filter as defined in claim 1, said method comprising the steps of:
   (a) adding rice hull ash (RHA) to a volume of water, said RHA; and
   (b) passing the volume of water through a porous ceramic substrate having an average pore size in the range of about 0.2 to about 100 microns;
   wherein said RHA has an average particle size which is greater than the average pore size of the ceramic substrate.

12. The method of making a water filter defined in claim 11, wherein said ceramic substrate has an average pore size in the range of about 10 to about 100 microns.

13. The method of making a water filter defined in claim 11, wherein said ceramic substrate has an average pore size of about 30 microns.

14. The method of making a water filter defined in claim 11, wherein said RHA has an average pore size in the range of about 0.5 to about 10 microns.

15. The water filter defined in claim 11, wherein said RHA has an average particle size in the range of about 120 to about 150 microns.

16. The method of making a water filter defined in claim 11, wherein said porous ceramic substrate is made of a material comprising essentially aluminum oxide.

17. The method of making a water filter defined in claim 11, wherein the RHA is made of a material comprising essentially amorphous silicon dioxide.

18. The method of making a water filter defined in claim 11, wherein said ceramic substrate comprises a cylindrical wall which forms a hollow cylinder with a cylindrical internal space and wherein housing directs the flow of water through the cylindrical wall.

19. The method of making a water filter defined in claim 11, wherein said housing directs the flow of water from outside of said hollow cylinder to the internal space.

20. The method of making a water filter defined in claim 11, further comprising the step of backwashing the RHA from the ceramic substrate, and repeating steps (a) and (b).

21. A reverse osmosis desalinization plant for sea water said plant comprising, in combination:
   (a) a micro-filtration unit for pre-filtering the sea water;
   (b) the water filter defined in claim 1, connected to receive the sea water from said micro-filtration unit and to remove extremely fine particles in said sea water; and
   (c) a reverse-osmosis unit, connected to receive the sea water from said water filter, for removing salts from said sea water.

22. A micro-filtration unit for waste water comprising, in combination:
   (a) a micro-filtration unit for filtering the waste water;
   (b) the water filter defined in claim 1, connected to receive the waste water from said micro-filtration unit and to remove extremely fine particles in said waste water; and
   (c) a disinfection unit, connected to receive water from said water filter, for killing pathenogenic biological agents in the water.

* * * * *